US011338803B2

(12) United States Patent
Nakanishi et al.

(10) Patent No.: US 11,338,803 B2
(45) Date of Patent: May 24, 2022

(54) TRAVELING TRACK DETERMINATION PROCESSING AND AUTOMATED DRIVE DEVICE

(71) Applicant: HONDA MOTOR CO., LTD., Tokyo (JP)

(72) Inventors: Kosuke Nakanishi, Wako (JP); Yuji Yasui, Wako (JP); Hideki Matsunaga, Wako (JP); Takeru Goto, Wako (JP); Yuki Ichino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 59 days.

(21) Appl. No.: 16/711,634

(22) Filed: Dec. 12, 2019

(65) Prior Publication Data

US 2020/0189584 A1 Jun. 18, 2020

(30) Foreign Application Priority Data

Dec. 17, 2018 (JP) .............................. JP2018-235389

(51) Int. Cl.
*B60W 30/12* (2020.01)
*B60W 50/00* (2006.01)
*B60W 30/18* (2012.01)

(52) U.S. Cl.
CPC ...... *B60W 30/12* (2013.01); *B60W 30/18145* (2013.01); *B60W 50/0097* (2013.01);
(Continued)

(58) Field of Classification Search
CPC .................................................... B60W 30/12
See application file for complete search history.

(56) References Cited

U.S. PATENT DOCUMENTS

2004/0193347 A1* 9/2004 Harumoto .............. G08G 1/167
701/45
2010/0295668 A1* 11/2010 Kataoka ............... B62D 15/025
340/435

(Continued)

FOREIGN PATENT DOCUMENTS

CN 106314419 A 1/2017
JP 2006-273230 A 10/2006

(Continued)

OTHER PUBLICATIONS

Office Action dated Dec. 28, 2021, issued in counterpart to CN Application No. 201910959980.0, with English Translation. (15 pages).

(Continued)

*Primary Examiner* — Jean Paul Cass
(74) *Attorney, Agent, or Firm* — WHDA, LLP

(57) ABSTRACT

An ECU of an automated drive device determines a future traveling track for a vehicle using a first straight line that extends in a forward direction of the vehicle, a second straight line that extends along a second course, and a curved track that extends between a first predetermined point on the first straight line and a second predetermined point on the second straight line. After determination of the future traveling track, the vehicle turns to the right in an intersection during actual traveling on the traveling track, if a median strip is present in a course of the vehicle, a changed track is calculated so as to avoid interference of the vehicle with the median strip.

11 Claims, 11 Drawing Sheets

(52) U.S. Cl.
CPC ..... *B60W 2520/06* (2013.01); *B60W 2520/10* (2013.01); *B60W 2552/00* (2020.02)

(56) References Cited

U.S. PATENT DOCUMENTS

| | | | | |
|---|---|---|---|---|
| 2013/0079990 | A1* | 3/2013 | Fritsch | G06T 7/11 701/41 |
| 2016/0046290 | A1* | 2/2016 | Aharony | B60W 30/0953 701/41 |
| 2018/0024562 | A1* | 1/2018 | Bellaiche | G06T 7/73 701/26 |
| 2018/0025235 | A1* | 1/2018 | Fridman | G06T 7/337 382/103 |
| 2018/0148052 | A1* | 5/2018 | Suto | B60W 30/18145 |
| 2019/0258251 | A1* | 8/2019 | Ditty | G06K 9/00805 |
| 2019/0384294 | A1* | 12/2019 | Shashua | G05D 1/0088 |

FOREIGN PATENT DOCUMENTS

| | | | | |
|---|---|---|---|---|
| JP | 2007-049219 A | | 2/2007 | |
| JP | 2007164339 A | | 6/2007 | |
| JP | 2008007079 A | * | 1/2008 | ............. B60Q 1/525 |
| JP | 2008-196968 A | | 8/2008 | |
| JP | 2018-87763 A | | 6/2018 | |
| JP | 2018087763 A | * | 6/2018 | ...... B60W 30/18145 |
| WO | WO-2020198134 A1 | * | 10/2020 | ......... G06K 9/00791 |

OTHER PUBLICATIONS

Office Action dated Nov. 2, 2021, issued in counterpart JP Application No. 2018-235389, with English Translation. (8 pages).

\* cited by examiner

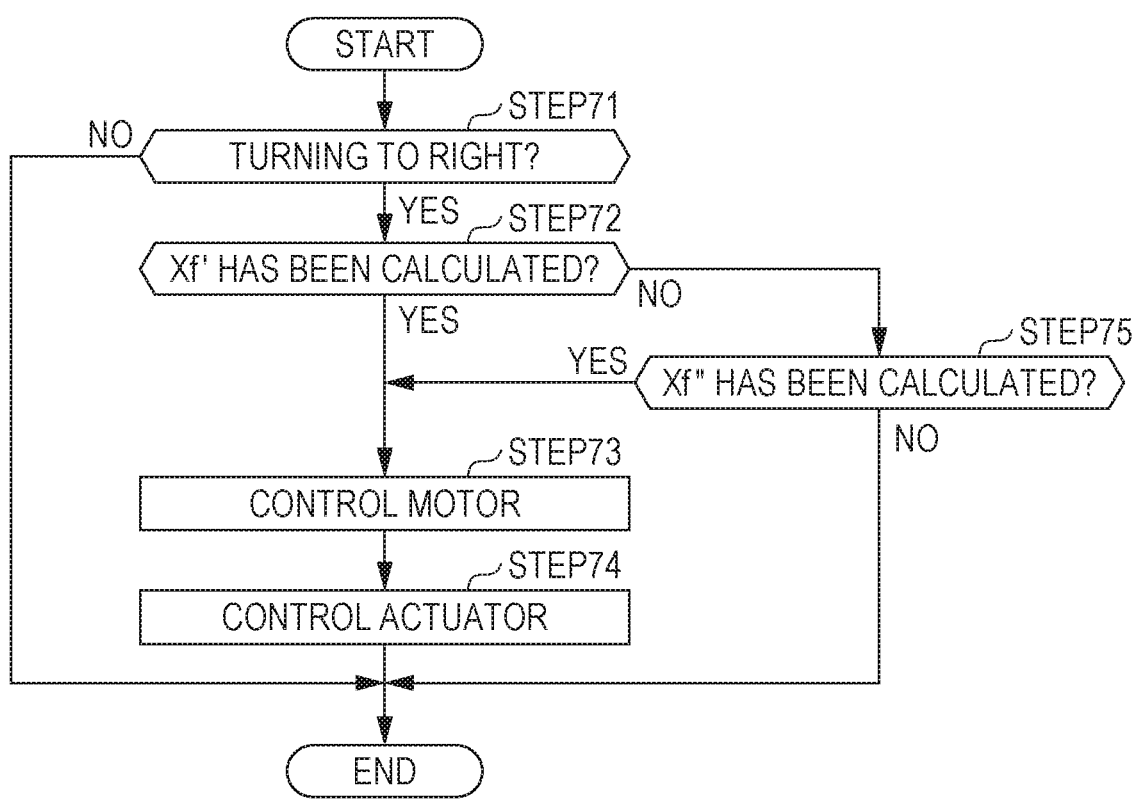

TRAVELING TRACK DETERMINATION PROCESSING AND AUTOMATED DRIVE DEVICE

CROSS REFERENCES TO RELATED APPLICATIONS

The present application claims priority under 35 U.S.C. § 119 to Japanese Patent Application No. 2018-235389, filed Dec. 17, 2018, entitled "Traveling Track Determination Processing and Automated Drive Device." The contents of this application are incorporated herein by reference in their entirety.

TECHNICAL FIELD

The present disclosure relates to a traveling track determination device or the like that determines a future traveling track for a vehicle at traveling on a bent course.

BACKGROUND

A traveling track determination device described in Japanese Unexamined Patent Application Publication No. 2018-87763 has been known as a traveling track device. The traveling track determination device serves to determine a traveling track for an automated drive vehicle traveling in an area having no lane mark such as an intersection, and includes a storage unit that stores map data. In traveling track determination processing, when the vehicle turns to the right or left in the intersection, based on lane network data in the map data, virtual lane marks are created on both sides of the lane. Then, an area between the two lane marks is set as a drivable area. Thus, when turning to the right or left in the intersection, the automated drive vehicle controls the traveling state based on the lane network data and the drivable area.

SUMMARY

It is disadvantageous that, since the traveling track determination device of the related art determines the drivable area based on the lane network data, the traveling track determination device is difficult to determine the lane network data and the drivable area if there is no lane network data.

The present disclosure provides a traveling track determination device that, when a vehicle travels on a bent course, properly determines a future traveling track even if there is no map data or the like.

A traveling track determination device 1 of one aspect of the present disclosure is a traveling track determination device 1 that determines a future traveling track Xf for a vehicle 3 when the vehicle 3 travels from a first course 31 toward a second course 32 bent and connected to the first course 31, and includes: a second course target point acquisition unit (ECU 2, second course target point calculation part 11) that acquires a second course target point Xt that is a target on the second course 32; a traveling track determination unit (ECU 2, traveling track calculation part 17) that determines the future traveling track Xf for the vehicle 3 using a first straight line L1 that extends from the vehicle 3 in a forward direction of the vehicle 3 through a continuous section (intersection 30) of the first course 31 and the second course 32, a second straight line L2 that extends along the second course 32 through the second course target point Xt and intersects with the first straight line L1 in the continuous section (intersection 30), and a first curved line (curved track Xfb) that extends between a first predetermined point X1 on the first straight line L1 and a second predetermined point X2 on the second straight line L2 and protrudes toward an intersection (second intersection Xc2) of the first straight line L1 and the second straight line L2, such that the at least a portion of the first curved line (curved track Xfb) is included in the continuous section (intersection 30); a lane boundary area acquisition unit (ECU 2) that acquires a lane boundary area (median strip 32a) corresponding to a boundary area between a lane on which the vehicle 3 travels and an opposite lane on the second course 32; a traveling environment acquisition unit (ECU 2, status detection device 4) that acquires traveling environment of the traveling vehicle 3 when the vehicle 3 actually travels on the traveling track Xf after determination of the future traveling track Xf; and a traveling track change unit (ECU 2) that, when the vehicle 3 travels toward the second course 32 while the vehicle 3 crosses the opposite lane of the first course 31 in the continuous section (intersection 30), changes the future traveling track Xf so as to avoid interference of the vehicle 3 with the lane boundary area (median strip 32a) if it is determined that the lane boundary area (median strip 32a) is present in a course of the vehicle 3 based on a traveling environment result acquired by the traveling environment acquisition unit.

In the traveling track determination processing, the second course target point that is the target on the second course is acquired. Further, using the first straight line, the second straight line, and the first curved line, the future traveling track for the vehicle is determined such that at least a portion of the first curved line is included in the continuous section. The first straight line extends from the vehicle in the forward direction of the vehicle through the continuous section first course and the second course, and the second straight line extends along the second course through the second course target point and intersects with the first straight line in the continuous section. Further, the first curved line extends between the first predetermined point on the first straight line and the second predetermined point on the second straight line, and protrudes toward the intersection of the first straight line and the second straight line. Accordingly, by using the first straight line, the second straight line, and the first curved line, the future traveling track may be properly determined even if there is no map data or the like.

The lane boundary area corresponding to the boundary area between the lane on which the vehicle travels and the opposite lane on the second course is acquired, and when the vehicle actually travels on the traveling track after determination of the future traveling track, the traveling environment of the travelling vehicle is acquired. When the vehicle travels toward the second course while crossing the opposite lane of the first course in the continuous section, if it is determined that the lane boundary area is present in the forward direction of the vehicle based on the traveling environment result acquired by the traveling environment acquisition unit, the traveling track is changed so as to avoid interference of the vehicle with the lane boundary area. Thus, for example, in the case where the lane boundary area has a height such as the median strip, the vehicle travelling toward the second course may be prevented from contacting the lane boundary area ("acquire" as used in "acquire the second course target point" in this specification is not limited to direct detection of the value using a sensor or the like, and includes calculation of the value based on other parameters).

According to other aspect of the present disclosure, preferably, a first boundary line acquisition unit (ECU 2) that acquires a first boundary line Lb1 defining a boundary between the first course 31 and the continuous section (intersection 30) is further provided, and the traveling track determination unit determines the future traveling track Xf such that the first predetermined point X1 on the first straight line L1 is displaced from a first intersection Xc1 that is an intersection of the first straight line L1 and the first boundary line Lb1 in the forward direction of the vehicle 3.

The traveling track determination device acquires a first boundary line defining a boundary between the first course and the continuous section, and determines the future traveling track such that the first predetermined point on the first straight line is displaced from the first intersection that is the intersection of the first straight line and the first boundary line in the forward direction of the vehicle. By determining the future traveling track as describe above, as compared to the case where the first predetermined point on the first straight line is set as the first intersection, the length of the section of the future traveling track, which matches the first straight line of the traveling track, may be increased. Thus, for example, in the case where the traffic division for the vehicle is specified as the left-hand traffic, when the vehicle turns to the right in the intersection that is the continuous section according to the future traveling track determined as describe above, as compared to the case where future traveling track curvedly extends to be curved from the first intersection of the first straight line, a time required to cross the opposite lane in the intersection may be reduced.

According to other aspect of the present disclosure, preferably, given that the intersection of the second straight line L2 and the first straight line L1 is a second intersection Xc2, the traveling track determination unit determines a displacement (first offset value Offset1) of the first predetermined point X1 from the first intersection Xc1 according to a distance (first distance D1) between the second intersection Xc2 and the first intersection Xc1.

The traveling track determination device may properly determine the position of the first predetermined point according to the distance between the second intersection and the first intersection, that is, size of the continuous section in the forward direction of the vehicle.

According to other aspect of the present disclosure, preferably, a second boundary line acquisition unit (ECU 2) that acquires a second boundary line Lb2 defining a boundary between the second course 32 and the continuous section (intersection 30) is further provided, and the traveling track determination unit determines the future traveling track Xf such that the second predetermined point X2 on the second straight line L2 is displaced from a third intersection (second course target point Xt) that is an intersection of the second straight line L2 and the second boundary line Lb2 toward a side opposite to the continuous section (intersection 30).

The traveling track determination device acquires the second boundary line defining the boundary between the second course and the continuous section, and determines the second predetermined point on the second straight line is displaced from the future traveling track such that the third intersection that is the intersection of the second straight line and the second boundary line toward the side opposite to the continuous section. By determining the future traveling track in this manner, as compared to the case where the second predetermined point on the second straight line is set as the second intersection, a time during which the vehicle is directed to the second course and travels may be increased. This may reduce the angle of the vehicle at arrival at the second predetermined point on the second straight line, thereby decreasing a lateral G force applied to occupants when the vehicle enters into the second course.

According to other aspect of the present disclosure, preferably, given that the intersection of the second straight line L2 and the first straight line L1 is a second intersection Xc2, the traveling track determination unit determines a displacement (second offset value Offset2) of the second predetermined point X2 from the third intersection (second course target point Xt) according to a distance (second distance D2) between the third intersection (second course target point Xt) and the second intersection Xc2.

The traveling track determination device may properly determine the second predetermined point according to the distance between the second intersection and the third intersection, that is, size of the continuous section in the extending direction of the second straight line.

According to other aspect of the present disclosure, preferably, when the future traveling track Xf is changed, the traveling track change unit determines a point closer to the intersection of the second straight line and the first straight line L1 than the second predetermined point X2 on the second straight line L2 as a third predetermined point (interference avoidance point X3), and changes the future traveling track Xf to a track (changed track Xf') connecting a straight track between the vehicle 3 to the third predetermined point (interference avoidance point X3) to a straight track between the third predetermined point (interference avoidance point X3) and the second predetermined point X2.

When the future traveling track is changed, the traveling track determination device determines the point closer to the intersection of the second straight line and the first straight line than the second predetermined point on the second straight line as a third predetermined point. Then, the future traveling track is changed to the track connecting the straight track between the vehicle and third predetermined point to the straight track between the third predetermined point and the second predetermined point. Accordingly, simply by determining the third predetermined point, the future traveling track may be changed so as to avoid interference of the vehicle with the lane boundary area.

According to other aspect of the present disclosure, preferably, a vehicle speed acquisition unit (ECU 2, status detection device 4) that acquires a vehicle speed VP that is a speed of the vehicle 3, and a lane width acquisition unit (ECU 2, status detection device 4) that acquires a lane width W that is a width of the traveling lane for the vehicle 3 on the second course 32 are further provided, and when the future traveling track Xf is changed, the traveling track change unit determines a point closer to the intersection (second intersection Xc2) of the second straight line L2 and the first straight line L1 than the second predetermined point X2 on the second straight line L2 if the vehicle speed VP is a predetermined vehicle speed VP1 or more or the lane width W is a predetermined width W1 or less as a third predetermined point (interference avoidance point X3"), and determines a changed future traveling track (changed track Xf") using a third straight line L3 that extends from the vehicle 3 through the third predetermined point (interference avoidance point X3"), and a second curved line (curved track Xf"2) that extends between a fourth predetermined point X4 closer to the vehicle 3 than the third predetermined point (interference avoidance point X3") on the third straight line L3 and the second predetermined point X2 on the second straight line L2 and protrudes toward the third predetermined point (interference avoidance point X3").

The traveling track determination device uses the third straight line and the second curved line if the vehicle speed is the predetermined vehicle speed or more or the lane width is the predetermined width or less to determine the changed traveling track. The third straight line extends from the vehicle through the third predetermined point on the second straight line. Therefore, in the case where the future traveling track consisting of the third straight line and the second straight line is shaped like a bent line, if the vehicle speed is the predetermined vehicle speed or more, that is, high, the vehicle is likely to travel off the traveling track. In addition, if the lane width is the predetermined width or less, that is, narrow, the vehicle is likely to be hard to enter into the second course. To address with this, the traveling track determination device determines the changed future traveling track using the third straight line and the second curved line, and the second curved line extends between the fourth predetermined point that is closer to the vehicle than the third predetermined point on the third straight line and the second predetermined point on the second straight line, and protrudes toward the third predetermined point. Accordingly, as compared to the case where the future traveling track is shaped like a bent line, the vehicle may be suppressed from traveling off the traveling track even if the vehicle speed is high, and the vehicle may smoothly enter into the second course even if the lane width is small.

According to other aspect of the present disclosure, preferably, the traveling environment acquisition unit acquires whether there exists a structure having a height in a lane boundary area (median strip 32a), and if the structure having the height is present in the lane boundary area (median strip 32a) in the forward direction of the vehicle 3, the traveling track change unit changes the future traveling track Xf so as to avoid interference of the vehicle 3 with the structure.

In the traveling track determination processing, when the presence or absence of the structure having a height in the lane boundary area is acquired, and structure having the height is present in the lane boundary area in the forward direction of the vehicle, the future traveling track is changed. This may avoid contact of the vehicle with the structure having a height, for example, the median strip.

An automated drive device 1 of the present disclosure may include any one of the above-mentioned traveling track determination devices 1 and a control unit (ECU 2) that controls a traveling state of the vehicle 3 using the future traveling track Xf.

The automated drive device controls the traveling state of the vehicle using the future traveling track determined as described above. Therefore, when the vehicle travels on a bent course, the traveling state of the vehicle may be smoothly controlled even if there is no map data or the like. In the above explanation of the exemplary embodiment, specific elements with their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

The advantages of the disclosure will become apparent in the following description taken in conjunction with the following drawings.

FIG. 12 is a flow chart illustrating changed track control processing during right turn in the second embodiment.

DETAILED DESCRIPTION

Hereinafter, with reference to the figures, a traveling track determination device and an automated drive device according to a first embodiment of the present disclosure are described. The automated drive device in this embodiment also serves as the traveling track determination device. Thus, in the following description of the automated drive device, functions and configuration of the traveling track determination device are also described.

Figure 1:
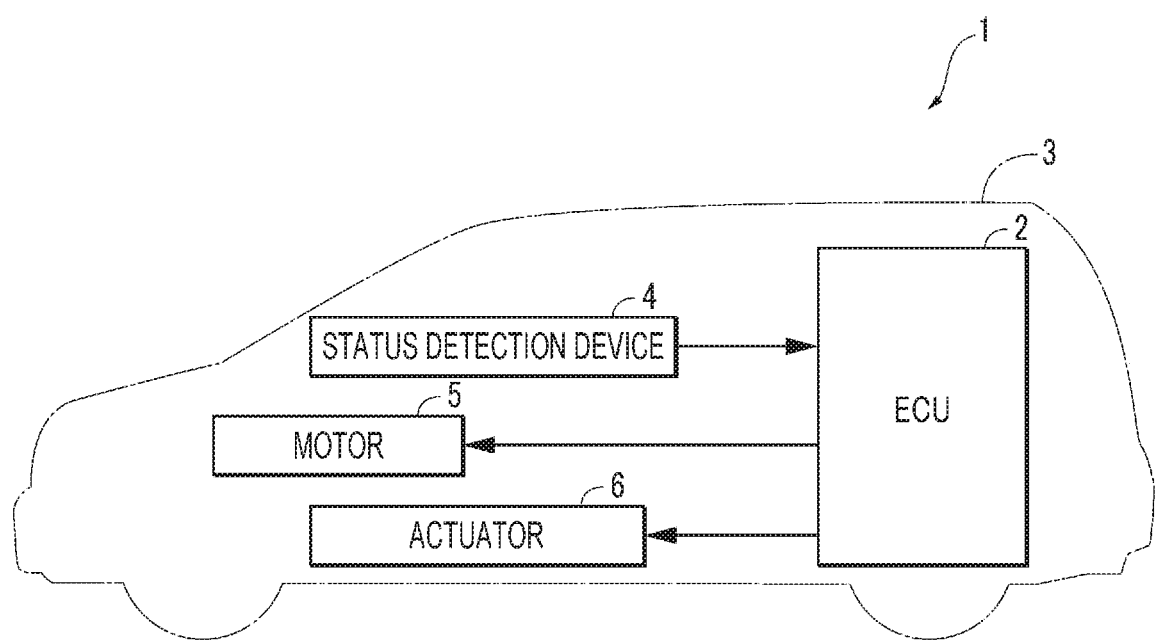
FIG. 1 is a schematic view illustrating the configuration of an automated drive device and an automated drive vehicle to which the automated drive device is applied, according to a first embodiment of the present disclosure.

As illustrated in FIG. 1, an automated drive device 1 is applied to a four-wheeled vehicle 3 and includes an ECU 2. A status detection device 4, a motor 5, and an actuator 6 are electrically connected to the ECU 2.

The status detection device 4 is configured of a camera, a millimeter-wave radar, an LIDAR, a sonar, a GPS, and various sensors, and outputs surrounding status data D_info indicating the position of the vehicle 3 and the surrounding status (traffic environment, traffic participants, and so forth) in the forward direction of the vehicle 3 to the ECU 2. In this embodiment, the status detection device 4 corresponds to a traveling environment acquisition unit, a vehicle speed acquisition unit, and a lane width acquisition unit.

As described later, the ECU 2 recognizes the position of the vehicle 3 and the traffic environment surrounding the vehicle 3 based on the surrounding status data D_info sent from the status detection device 4, to determine a future traveling track Xf for the vehicle 3. In the following description, the future traveling track Xf is simply referred to as "traveling track Xf".

The motor 5 is constituted of, for example, an electric motor. As described later, when determining the traveling track Xf for the vehicle 3, the ECU 2 controls the output of the motor 5 such that the vehicle 3 travels along the traveling track Xf.

The actuator 6 is constituted of a braking actuator and a steering actuator. As described later, when determining the traveling track Xf for the vehicle 3, the ECU 2 controls the operation of the actuator 6 such that the vehicle 3 travels along the traveling track Xf.

On the contrary, the ECU 2 is constituted of a microcomputer including a CPU, a RAM, a ROM, an E2PROM, an I/O interface, various electric circuits, and the like (not illustrated). As described later, the ECU 2 executes various types of control processing such as traveling track calculation processing for right/left turn based on the above-described surrounding status data D_info sent from the status detection device 4.

In this embodiment, the ECU 2 corresponds to a second course target point acquisition unit, a traveling track determination unit, a lane boundary area acquisition unit, the traveling environment acquisition unit, a traveling track change unit, a first boundary line acquisition unit, a second boundary line acquisition unit, the vehicle speed acquisition unit, the lane width acquisition unit, and a control unit.

Figure 2:
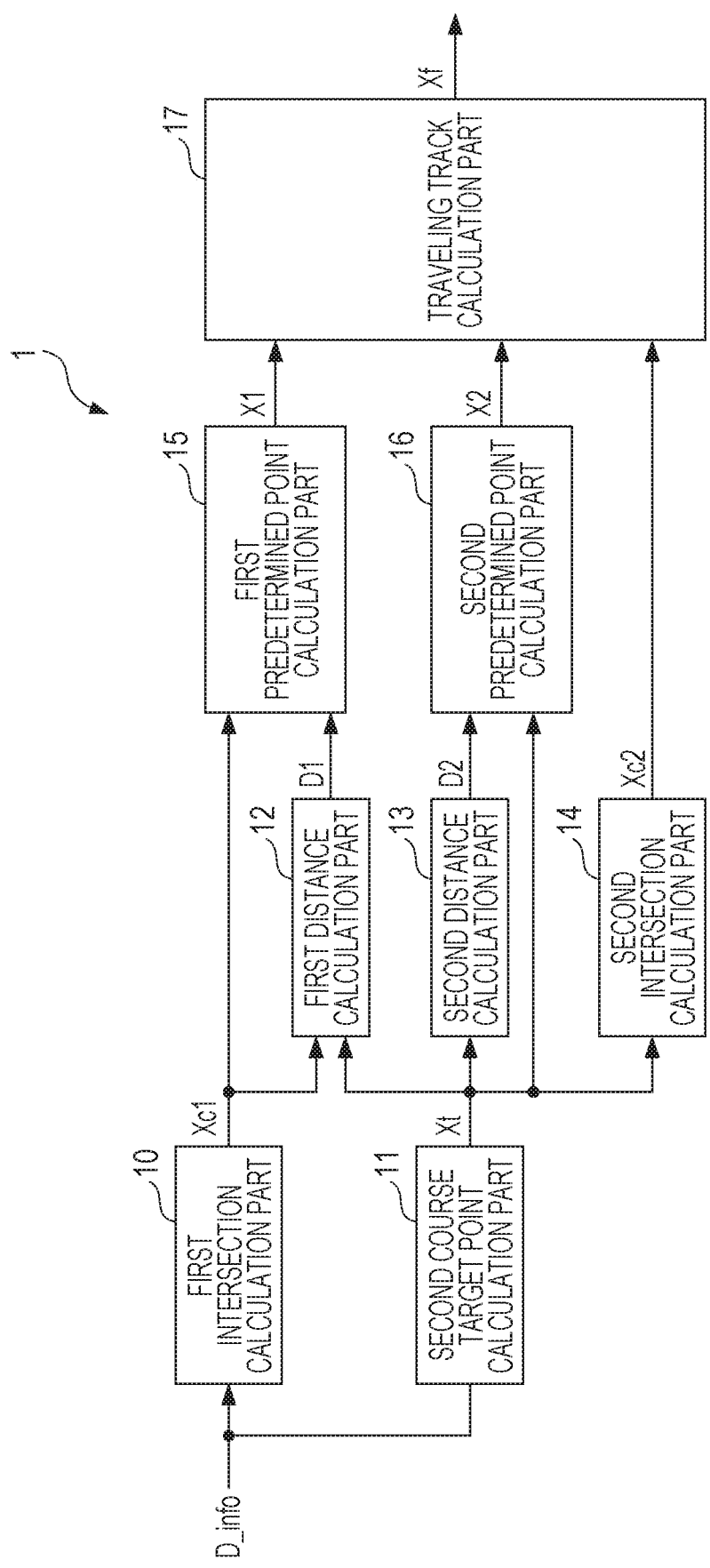
FIG. 2 is a block diagram illustrating the functional configuration of the automated drive device.
Figure 3:
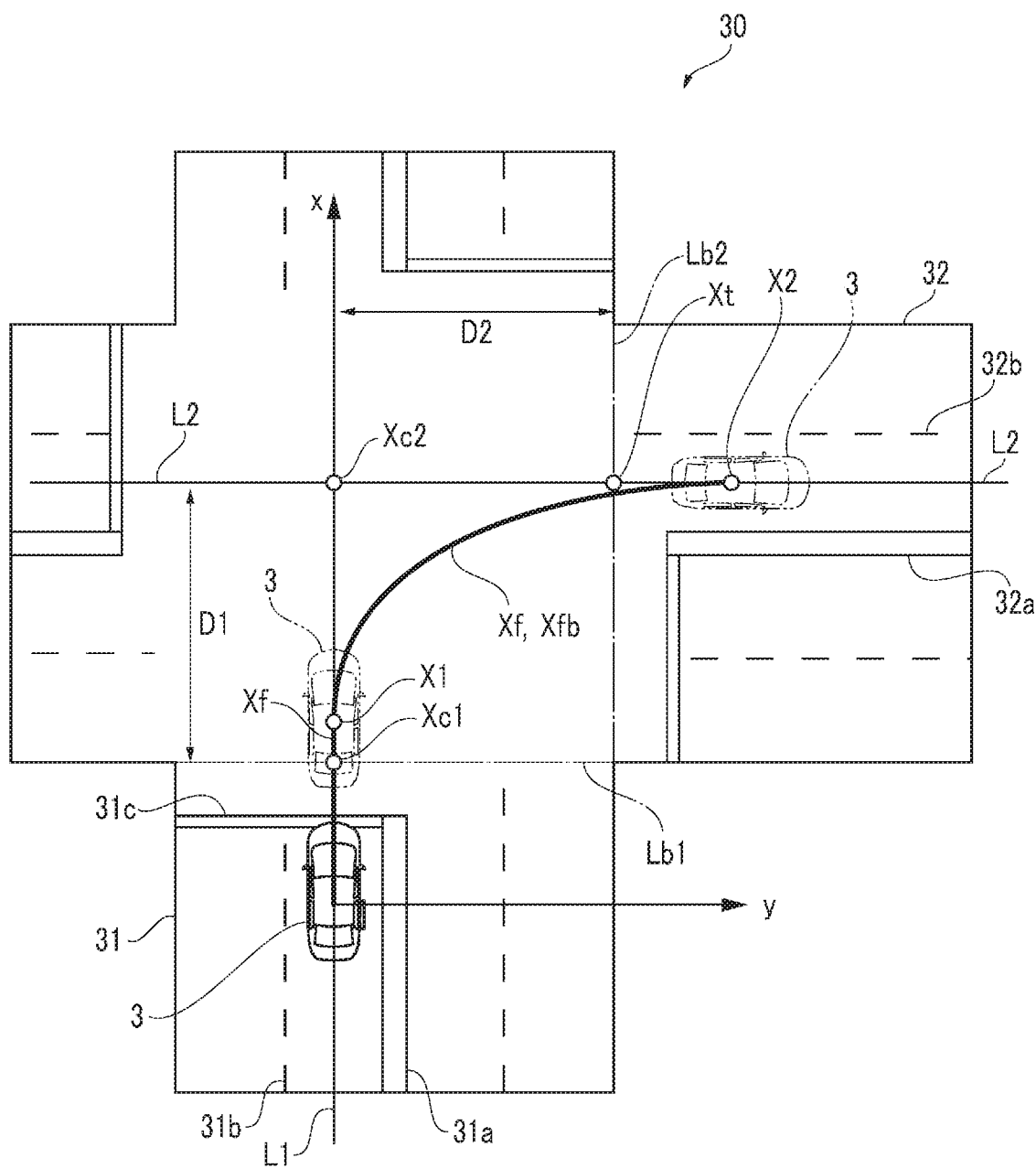
FIG. 3 is a view illustrating a method of calculating a traveling track at right turn in an intersection.
Figure 4:
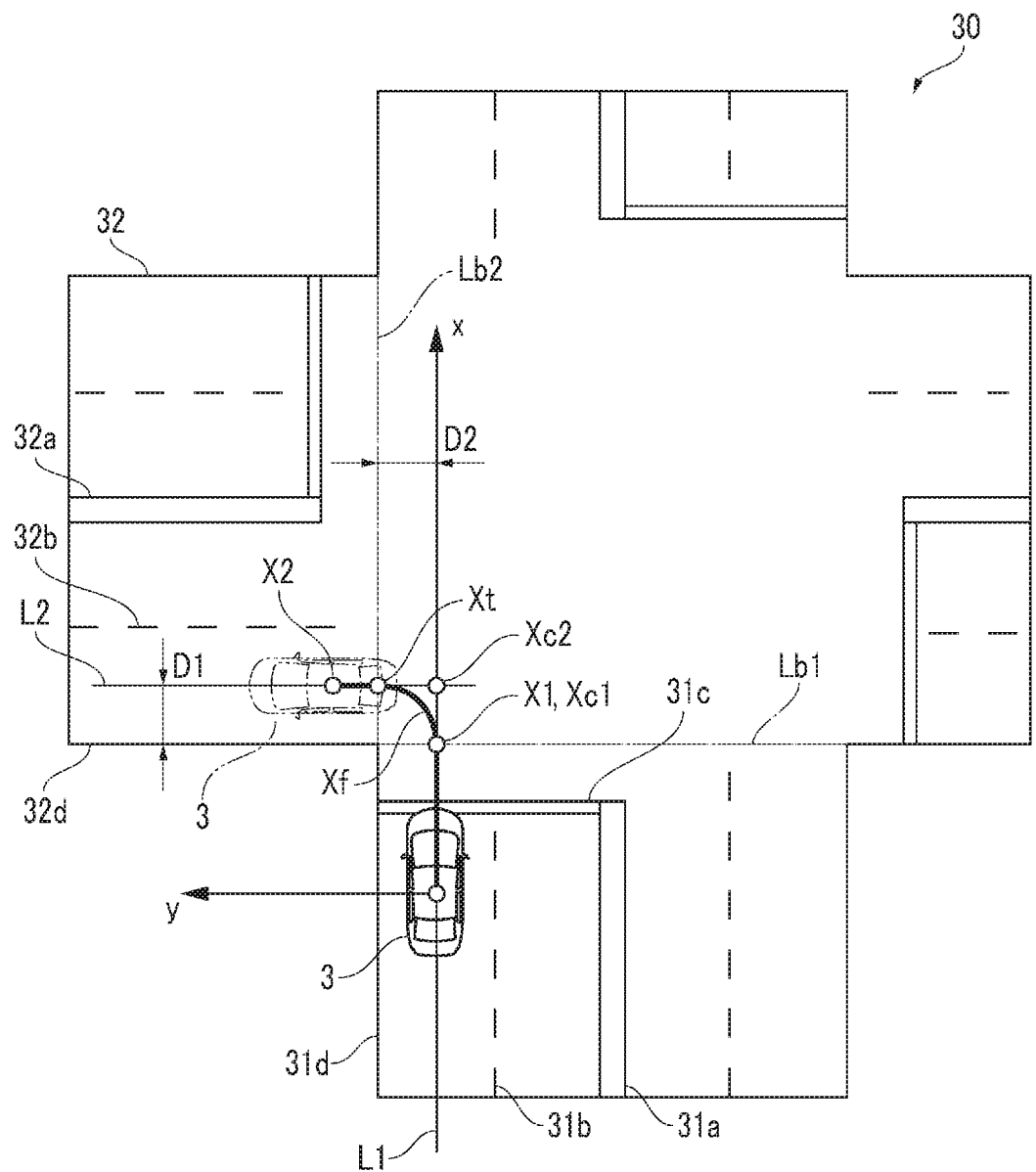
FIG. 4 is a view illustrating a method of calculating the traveling track at left turn in the intersection.

Next, with reference to FIGS. 2 to 4, the functional configuration of the automated drive device 1 in this embodiment is described. The automated drive device 1 calculates the traveling track Xf, for example, at right turn/left turn in an intersection according to a below-mentioned calculation algorithm. In the following description, the traffic division of the vehicle 3 is prescribed as the left-hand traffic.

As illustrated in FIG. 2, the automated drive device 1 includes a first intersection calculation part 10, a second course target point calculation part 11, a first distance calculation part 12, a second distance calculation part 13, a second intersection calculation part 14, a first predetermined point calculation part 15, a second predetermined point calculation part 16, and a traveling track calculation part 17, and these components 10 to 17 are specifically configured of the ECU 2.

First, with reference to FIG. 3, a method of calculating the traveling track Xf in the case where the vehicle 3 turns to the right in an intersection 30 (continuous section) of a crossroad is described. In the intersection 30, a course 31 on which the vehicle 3 currently travels before starting right turn in the intersection 30 is orthogonal to a course 32 to be traveled after the right turn. In the following description, the course 31 on which the vehicle 3 currently travels is referred to as "first course 31", and the course 32 to be traveled after the right turn is referred to as "second course 32".

Further, as illustrated in the figure, the vehicle 3 turns to the right from a traveling lane between a median strip 31a and a lane boundary line 31b indicated by a broken line on the first course 31 toward a traveling lane between a median strip 32a (lane boundary area) and a lane boundary line 32b indicated by a broken line on the second course 32 across a stop line 31c.

In this case, assuming that around the center of the vehicle 3 is an origin, the forward direction of the vehicle 3 is an x axis, and a direction orthogonal to the x axis is a y axis, the traveling track Xf (Xf_x, Xf_y) is calculated using a combination of an x coordinate value and a y coordinate value as relative coordinates of the vehicle 3. At right turn, the x axis coordinate value becomes a larger positive value as the vehicle travels in the forward direction, and the y axis coordinate value becomes a larger positive value as the vehicle travels to the right. In the following description, a straight line that extends along the x axis is defined as a first straight line L1.

First, the first intersection calculation part 10 is described. The first intersection calculation part 10 acquires a first boundary line Lb1 indicating the boundary between the intersection 30 and the first course 31 based on the surrounding status data D_info, and calculates an intersection between the first boundary line Lb1 and the first straight line L1 (that is, the x axis) as a first intersection Xc1 (Xc1_x, Xc1_y). In this case, a y coordinate value Xc1_y of the first intersection Xc1 becomes 0.

The second course target point calculation part 11 acquires a second boundary line Lb2 indicating the boundary between the intersection 30 and the second course 32 based on the surrounding status data D_info, and calculates a point located at the center of the lane on which the vehicle 3 travels on the second course 32, as a second course target point Xt (Xt_x, Xt_y) on the second boundary line Lb2. In this embodiment, the second course target point calculation part 11 corresponds to the second course target point acquisition unit, and the second course target point Xt corresponds to a third intersection.

Further, in the first distance calculation part 12, given that a straight line that passes the second course target point Xt and is parallel to the second course 32 is a second straight line L2, an interval between the second straight line L2 and the first boundary line Lb1 is calculated as a first distance D1. That is, the first distance D1 is calculated as a difference between the x coordinate value Xt_x of the second course target point Xt and the x coordinate value Xc1_x of the first intersection Xc1 (D1=Xt_x−Xc1_x).

On the contrary, the second distance calculation part 13 calculates an interval between the second course target point Xt and the first straight line L1 is calculated as a second distance D2. That is, the second distance D2 is calculated as the y coordinate value Xt_y of the second course target point Xt (D2=Xt_y).

The second intersection calculation part 14 calculates an intersection of the first straight line L1 and the second straight line L2 as a second intersection Xc2 (Xc2_x, Xc2_y). In this case, the x coordinate value Xc2_x of the second intersection Xc2 becomes equal to the x coordinate value Xt_x of the second course target point Xt (Xc2_x=Xt_x). Since the second intersection Xc2 is located on the x axis, the y coordinate value Xc2_y becomes 0.

Further, the first predetermined point calculation part 15 calculates a first predetermined point X1 (X1_x, X1_y) as described below. First, a first offset value Offset1 is calculated by searching a map not illustrated according to the first distance D1. In the map, the first offset value Offset1 is set to fall within a range from a value 0 to a predetermined value (for example, 2 m) and more specifically, to be larger as the first distance D1 increases.

Subsequently, the x coordinate value X1_x of the first predetermined point X1 is calculated as a sum of the x coordinate value Xc1_x of the first intersection Xc1 and the first offset value Offset1 (X1_x=Xc1_x+Offset1). Since the first predetermined point X1 is located on the x axis, the y coordinate value X1_y becomes 0.

On the contrary, the second predetermined point calculation part 16 calculates a second predetermined point X2 (X2_x, X2_y) as described below. First, a second offset value Offset2 is calculated by searching a map not illustrated according to the second distance D2. In the map, the second offset value Offset2 is set to fall in a range from a value 0 to a predetermined value (for example, 2 m) and more specifically, to be larger as the second distance D2 increases. At right turn, the second offset value Offset2 is calculated as the above-mentioned predetermined value or its approximate value.

Subsequently, the y coordinate value X2_y of the second predetermined point X2 is calculated as a sum of the y coordinate value Xt_y of the second course target point Xt and the second offset value Offset2 (X2_y=Xt_y+Offset2). Since the second predetermined point X2 is located on the second straight line L2, the x coordinate value X2_x becomes equal to the x coordinate value Xt_x of the second course target point Xt (X2_x=Xt_x).

Further, the traveling track calculation part 17 first calculates a curved track Xfb (Xfb_x, Xfb_y) as a quadratic Bézier curve using the first predetermined point X1, the second predetermined point X2, and the second intersection Xc2 as three control points, according to following equations (1) and (2). t in the following equations (1) and (2) is a parameter that continuously changes in a range of 0 t 1.

$$Xfb\_x(t)=X1\_x\cdot(1-t)^2+Xc2\_x\cdot 2t\cdot(t-1)+X2\_x\cdot t^2 \quad (1)$$

$$Xfb\_y(t)=X1\_y\cdot(1-t)^2+Xc2\_y\cdot 2t\cdot(t-1)+X2\_y\cdot t^2 \quad (2)$$

Then, the traveling track Xf at right turn in the intersection 30 is calculated as a track connecting a straight track between the first intersection Xc1 and the first predetermined point X1 to the curved track Xfb. In this embodiment, the traveling track calculation part 17 corresponds to the traveling track determination unit, and the curved track Xfb corresponds to a first curved line.

Next, with reference to FIG. 4, a method of calculating the traveling track Xf in the case where the vehicle 3 turns to the left in the intersection 30 is described. As illustrated in the figure, the vehicle 3 turns to the left from a traveling lane between an outer boundary line 31d and the lane boundary line 31b indicated by a broken line on the first course 31 toward a traveling lane between an outer boundary line 32d and the lane boundary line 32b indicated by a broken line on the second course 32 across the stop line 31c.

In the automated drive device 1, the method of calculating the traveling track Xf is substantially same at left turn and right turn, except for only some matters. The different matters are described below.

First, at left turn as opposed to right turn, the y axis coordinate value of the relative coordinates of the vehicle 3 is calculated to become a larger positive value as the vehicle 3 travels to the left. The y axis of the relative coordinates of the vehicle 3 at left turn may be set in the same manner as that at right turn, and in various calculations, an absolute y axis coordinate value may be used.

The first distance D1 at left turn is calculated to be much smaller than the first distance D1 at right turn. Therefore, the first predetermined point calculation part 15 calculates the first offset value Offset1 as 0, so that the first intersection Xc1 and the first predetermined point X1 are located at the same position. Thus, the traveling track Xf is calculated as the same track as the curved track Xfb.

Further, the second distance D2 at left turn is also calculated to be much smaller than the second distance D2 at right turn. Therefore, the second predetermined point calculation part 16 calculates the second offset value Offset2 as a value that is smaller than the value at right turn (for example, 1 m). The method of calculating the traveling track Xf at left turn in the intersection 30 is different from the method of calculating the traveling track Xf at right turn in the above-described matters.

Figure 5:
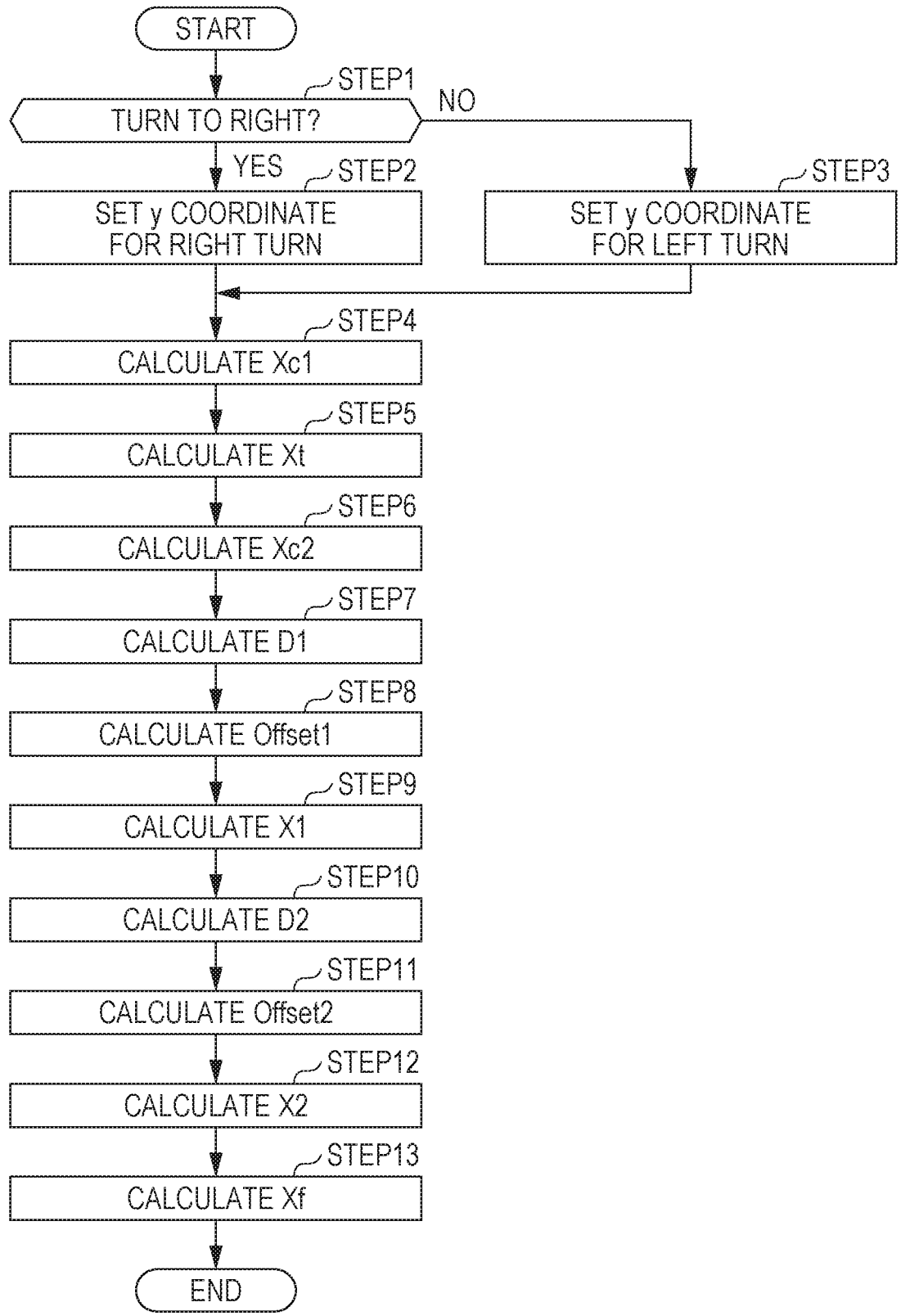
FIG. 5 is a flow chart illustrating traveling track calculation processing for right/left turn.

Next, with reference to FIG. 5, traveling track calculation processing for right/left turn is described. The ECU 2 executes the traveling track calculation processing to calculate the traveling track Xf for right/left turn or the like by the above-mentioned calculation method at a predetermined control cycle. Various values calculated in the following description are stored in the E2PROM of the ECU 2.

As illustrated in the figure, first, it is determined whether or not the vehicle 3 turns to the right in the intersection based on the surrounding status data D_info sent from the status detection device 4 (FIG. 5/STEP 1).

If the determination is YES (FIG. 5/STEP 1: YES), the y coordinate value for right turn is set (FIG. 5/STEP 2). That is, as described above, at right turn, the y axis coordinate value of the relative coordinates of the vehicle 3 is set to become a larger positive value as the vehicle 3 travels to the right.

On the contrary, if the determination is NO (FIG. 5/STEP 1: NO), that is, at left turn, the y coordinate value for left turn is set (FIG. 5/STEP 3). That is, at left turn, as described above, the y axis coordinate value of the relative coordinates of the vehicle 3 is set to become a larger positive value as the vehicle 3 travels to the left.

Subsequently, the first intersection Xc1 (Xc1_x, Xc1_y) is calculated based on the surrounding status data D_info by the above-mentioned method (FIG. 5/STEP 4). After that, the second course target point Xt (Xt_x, Xt_y) is calculated based on the surrounding status data D_info by the above-mentioned method (FIG. 5/STEP 5).

Subsequently, the second intersection Xc2 (Xc2_x, Xc2_y) is calculated by the above-mentioned method (FIG. 5/STEP 6). That is, the x coordinate value Xc2_x of the second intersection Xc2 is calculated to be equal to the x coordinate value Xt_x of the second course target point Xt, and the y coordinate value Xc2_y of the second intersection Xc2 is calculated as 0. After that, as described above, the first distance D1 is calculated as a difference between the x coordinate value Xt_x of the second course target point Xt and the x coordinate value Xc1_x of the first intersection Xc1 (FIG. 5/STEP 7).

Subsequently, as described above, the first offset value Offset1 is calculated by searching a map according to the first distance D1 (FIG. 5/STEP 8). After that, the first predetermined point X1 (X1_x, X1_y) is calculated by the above-mentioned method (FIG. 5/STEP 9). That is, the x coordinate value X1_x of the first predetermined point X1 is calculated as the value Xc1_x+Offset1, and the y coordinate value X1_y of the first predetermined point X1 is calculated as 0.

Next, as described above, the second distance D2 is calculated as the y coordinate value Xt_y of the second course target point Xt (FIG. 5/STEP 10). After that, as described above, the second offset value Offset2 is calculated by searching a map according to the second distance D2 (FIG. 5/STEP 11).

Subsequently, the second predetermined point X2 (X2_x, X2_y) is calculated by the above-mentioned method (FIG. 5/STEP 12). That is, the y coordinate value X2_y of the second predetermined point X2 is calculated as the value Xt_y+Offset2, and the x coordinate value X2_x of the second predetermined point X2 is calculated to be equal to the x coordinate value Xt_x of the second course target point Xt.

Next, the traveling track Xf (Xf_x, Xf_y) is calculated (FIG. 5/STEP 13). In this case, as described above, at right turn, the traveling track Xf is calculated as a track connecting the straight track between the first intersection Xc1 and the first predetermined point X1 to the curved track Xfb calculated by the above-mentioned equations (1) and (2). On the contrary, at left turn, the traveling track Xf is calculated as the curved track Xfb. In this manner, the traveling track Xf (Xf_x, Xf_y) is calculated and then, the present processing is terminated.

Figure 6:
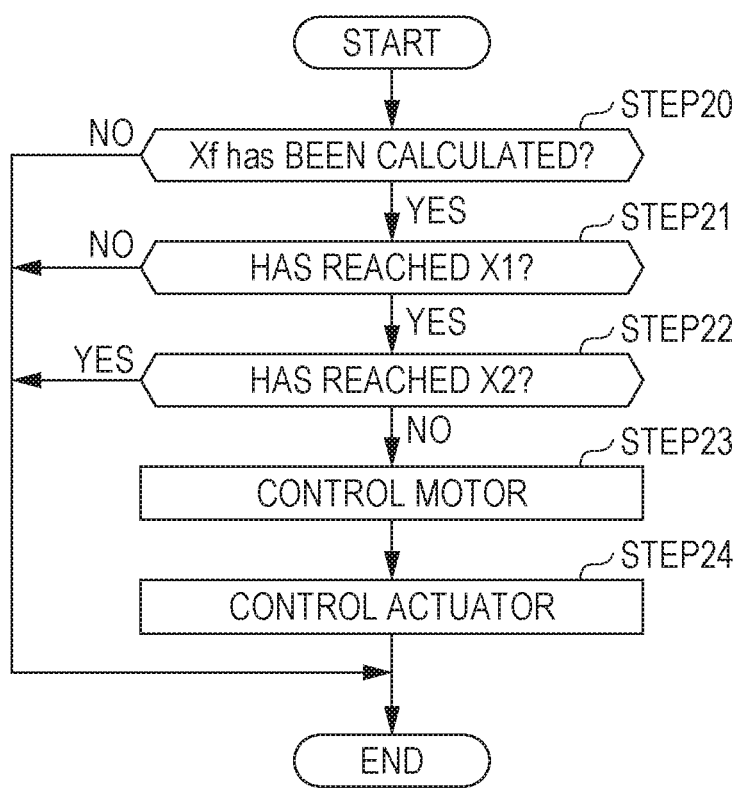
FIG. 6 is a flow chart illustrating automated drive control processing for right/left turn.

Next, with reference to FIG. 6, automated drive control processing for right/left turn is described. The ECU 2 executes the control processing to control the motor 5 and the actuator 6 such that the vehicle 3 travels on the traveling track Xf calculated as described above at a predetermined control cycle that is longer than the calculation cycle of the traveling track Xf.

As illustrated in the figure, first, it is determined whether or not the traveling track Xf for right/left turn has been calculated (FIG. 6/STEP 20). If the determination is NO (FIG. 6/STEP 20: NO), the present processing is terminated as it is.

On the contrary, if the determination is YES (FIG. 6/STEP 20: YES), that is, the traveling track Xf for right/left turn has been calculated, it is determined whether or not the vehicle 3 has reached the first intersection Xc1 (FIG. 6/STEP 21).

If the determination is NO (FIG. 6/STEP 21: NO), the present processing is terminated as it is. On the contrary, if the determination is YES (FIG. 6/STEP 21: YES), that is, the vehicle 3 has reached the first intersection Xc1, it is determined whether or not the vehicle 3 has reached the second predetermined point X2 (FIG. 6/STEP 22).

If the determination is YES (FIG. 6/STEP 22: YES), the present processing is terminated as it is. On the contrary, If the determination is NO (FIG. 6/STEP 22: NO), that is, the vehicle 3 has reached first intersection Xc1 and has not reached second predetermined point X2, the motor 5 is controlled such that the vehicle 3 travels on the traveling track Xf (FIG. 6/STEP 23).

Subsequently, the actuator 6 is controlled such that the vehicle 3 travels on the traveling track Xf (FIG. 6/STEP 24). After that, the present processing is terminated.

Next, changed track calculation processing during right turn and changed track control processing during right turn of the automated drive device 1 in this embodiment are described. First, with reference to FIG. 7, the principles of the processing are described.

Figure 7:
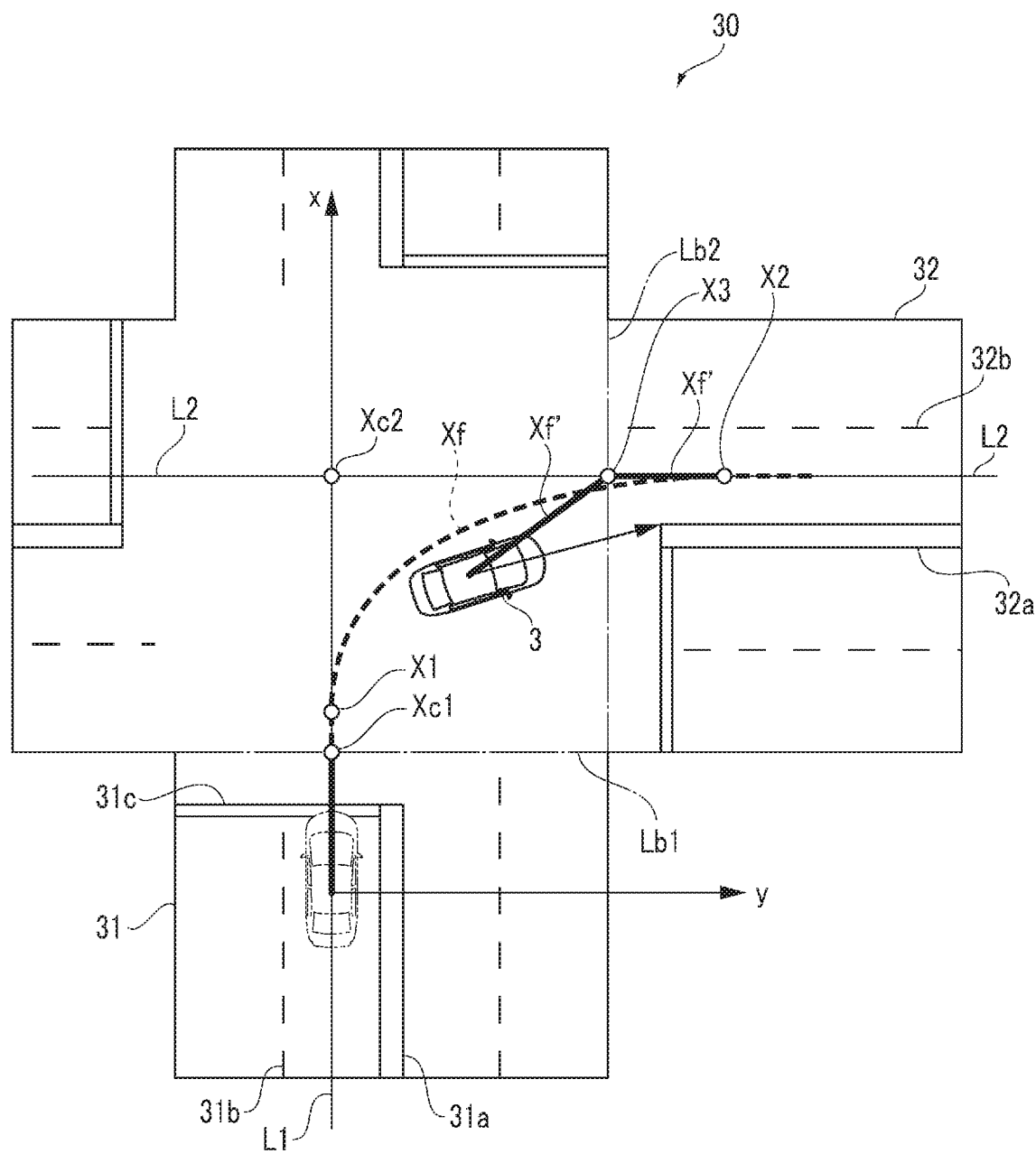
FIG. 7 is a view illustrating a principle of a method of calculating a changed track during right turn.

For example, in the case where the vehicle 3 turns to the right in the intersection 30, when the traveling track Xf for right turn is calculated as represented by a broken line in FIG. 7 and then, the automated drive control processing for right/left turn is executed, as illustrated in FIG. 7, the vehicle 3 may travel off the traveling track Xf for some reason.

When the vehicle 3 travels off the traveling track Xf, the automated drive device 1 may recognize that an obstacle such as the median strip 32a is present in the forward direction of the vehicle 3 based on the surrounding status data D_info sent from the status detection device 4. In this case, if the vehicle 3 continues to travel, the vehicle 3 can interfere with the obstacle. In this case, any object that has some height and must be avoided by the vehicle 3, such as the median strip 32a, corresponds to the obstacle, and any object that may be stepped over by the vehicle 3 without any problem, such as a white line, does not correspond to the obstacle.

When recognizing that the obstacle such as the median strip 32a is present in the forward direction of the vehicle 3 as describe above, the automated drive device 1 calculates a changed track Xf' as described below to avoid the obstacle. First, in place of the second predetermined point X2 at calculation of the traveling track Xf, an interference avoidance point X3 (third predetermined point) is calculated. The interference avoidance point X3 is located on the second straight line L2 and closer to the intersection 30 than the second predetermined point X2, and is calculated such that the vehicle 3 can avoid interference with the median strip 32a that is the obstacle while travelling toward the interference avoidance point X3.

Subsequently, the changed track Xf' is calculated as a track connecting the straight track between the vehicle 3 and the interference avoidance point X3 to the straight track between the interference avoidance point X3 and the second predetermined point X2. After that, the motor 5 and the actuator 6 are controlled such that the vehicle 3 travels on the changed track Xf'. This may avoid interference between the vehicle 3 and the median strip 32a.

Figure 8:
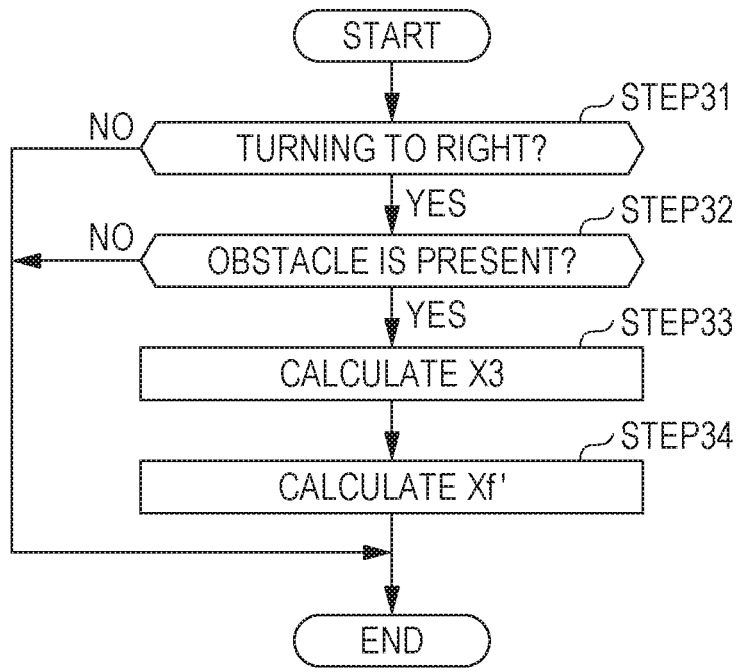
FIG. 8 is a flow chart illustrating changed track calculation processing during right turn.

Next, with reference to FIG. 8, the changed track calculation processing during right turn is described. The ECU 2 executes the processing to calculate the changed track Xf' at the same control cycle as the calculation cycle of the traveling track Xf.

As illustrated in the figure, first, it is determined whether or not the vehicle 3 is turning to the right (FIG. 8/STEP 31). If the determination is NO (FIG. 8/STEP 31: NO), the present processing is terminated as it is.

On the contrary, the determination is YES (FIG. 8/STEP 31: YES) and the vehicle 3 is turning to the right, it is determined whether or not the obstacle such as the median strip 32a is present in front of the vehicle 3 based on the surrounding status data D_info (FIG. 8/STEP 32).

If the determination is NO (FIG. 8/STEP 32: NO), the present processing is terminated as it is. On the contrary, if the determination is YES (FIG. 8/STEP 32: YES) and the obstacle such as the median strip 32a is present in front of the vehicle 3, the interference avoidance point X3 is calculated by the above-described method (FIG. 8/STEP 33).

Subsequently, as described above, the changed track Xf' is calculated as a track connecting the straight track between the vehicle 3 and the interference avoidance point X3 to the straight track between the interference avoidance point X3 and the second predetermined point X2 (FIG. 8/STEP 34). After that, the present processing is terminated.

Figure 9:
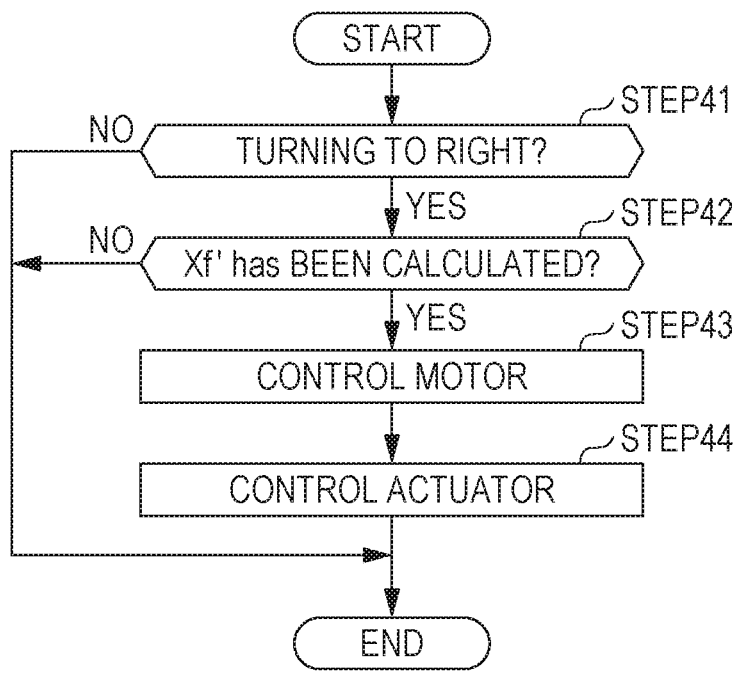
FIG. 9 is a flow chart illustrating changed track control processing during right turn.

Next, with reference to FIG. 9, the changed track control processing during right turn is described. The ECU 2 executes the processing to control the motor 5 and the actuator 6 such that the vehicle 3 travels on the changed track Xf' calculated as described above at the same control cycle as the cycle of the automated drive control processing for right/left turn.

As illustrated in the figure, first, it is determined whether or not vehicle 3 is turning to the right (FIG. 9/STEP 41). If the determination is NO (FIG. 9/STEP 41: NO), the present processing is terminated as it is.

On the contrary, if the determination is YES (FIG. 8/STEP 41: YES) and the vehicle 3 is turning to the right, it is determined whether or not changed track Xf' has been calculated (FIG. 8/STEP 42). If the determination is NO (FIG. 9/STEP 42: NO), the present processing is terminated as it is.

On the contrary, if the determination is YES (FIG. 9/STEP 42: YES) and the changed track Xf' has been calculated, the motor 5 is controlled such that the vehicle 3 travels on the changed track Xf' (FIG. 9/STEP 43).

Subsequently, the actuator 6 is controlled such that the vehicle 3 travels on the changed track Xf' (FIG. 9/STEP 44). After that, the present processing is terminated.

As described above, in the automated drive device 1 in first embodiment, the traveling track Xf at right turn in the intersection 30 is calculated as the track connecting the straight track between the first intersection Xc1 and the first predetermined point X1 to the curved track Xfb, based on the surrounding status data D_info. Since the curved track Xfb is calculated as the quadratic Bézier curve using the first predetermined point X1, the second predetermined point X2, and the second intersection Xc2 as the three control points by the equations (1) and (2), the future traveling track Xf may be properly determined even if there is no map data or the like.

The first predetermined point X1 is calculated as a point displaced from the first intersection Xc1 in the forward direction of the vehicle 3 by the first offset value Offset1, and the first offset value Offset1 is calculated by searching a map according to the first distance D1 that is the interval between the first boundary line Lb1 and the second straight line L2. Thus, when the vehicle 3 turns to the right/left, the position of the first predetermined point X1 may be properly determined according to the size of the intersection 30 in the forward direction of the vehicle 3.

Further, in the case of determining the traveling track Xf in this manner, as compared to the case where the first predetermined point X1 on the first straight line L1 is set to the first intersection Xc1 or the like, a length that matches the first straight line L1 of the traveling track Xf may be increased. As a result, for example, in the case where the traffic division of the vehicle 3 is specified as the left-hand traffic, when the vehicle 3 turns to the right in the intersection 30 according to the future traveling track Xf determined as describe above, as compared to the case where the future traveling track Xf is determined to curve from the first intersection Xc1 on the first straight line L1, a time required to cross over an opposite lane in the intersection 30 may be reduced.

On the contrary, the second predetermined point X2 is calculated as a point displaced from the second course target point Xt toward the back of the second course 32 by the second offset value Offset2, and the second offset value Offset2 is calculated by searching a map according to the second distance D2 that is the interval between the second course target point Xt and the first straight line L1. Thus, when the vehicle 3 turns to the right/left, the position of the second predetermined point X2 may be properly determined according to the size of the intersection 30 in the right/left turn direction of the vehicle 3.

In the case of determining the future traveling track Xf in this manner, as compared to the case where the second predetermined point X2 on the second straight line L2 is set as the second intersection Xc2, a time during which the vehicle 3 travels toward the second course 32 may be increased. As a result, the angle of the vehicle 3 at the time when the vehicle 3 reaches the second predetermined point X2 on the second straight line L2 may be decreased to reduce a lateral G-force applied to occupants when the vehicle 3 enters into the second course 32.

In the automated drive device 1, the motor 5 and the actuator 6 are controlled such that the vehicle 3 travels on the traveling track Xf thus determined. At this time, when the vehicle 3 travels off the traveling track Xf during right turn in the intersection 30 and the obstacle such as the median strip 32a is present in the forward direction of the vehicle 3, the changed track Xf' is calculated.

The changed track Xf' is calculated as a track connecting the straight track between the vehicle 3 and the interference avoidance point X3 to the straight track between the interference avoidance point X3 and the second predetermined point X2. The interference avoidance point X3 is located closer to the intersection 30 than the second predetermined point X2 on the second straight line L2, and is calculated such that the vehicle 3 may avoid the interference with the obstacle such as the median strip 32a while traveling toward the interference avoidance point X3. By controlling the motor 5 and the actuator 6 such that the vehicle 3 travels on the changed track Xf', the vehicle 3 during right turn may be prevented from interfering with the obstacle such as the median strip 32a. In particular, in the case where the obstacle like the median strip 32a has some height, the vehicle 3 traveling toward the second course 32 may be prevented from interfering with the obstacle.

Further, since the changed track Xf' is calculated as a track connecting the two straight tracks, that is, a track connecting two line segments, the changed track Xf' may be easily calculated, thereby easily changing a track for the vehicle 3 to be traveled from the traveling track Xf to the changed track Xf'.

In the first embodiment, the curved track Xfb that is a Bézier curve is used as the first curved line. However, the first curved line of the present disclosure is not limited to such a curved track, and may be any track that extends between a first predetermined point of a first straight line and a second predetermined point of a second straight line, and protrudes toward an intersection between the first straight line and the second straight line. For example, a B spline curve may be used as the first curved line.

In the first embodiment, the point located at the center of the traveling lane on the second course 32 for the vehicle 3 on the second boundary line Lb2 is set as the second course target point Xt. However, the second course target point of the present disclosure is not limited to this, and may be any target on the second course. For example, a point located at the center of the traveling lane on the second course 32 and in the rear of the second boundary line Lb2 on the second course 32 may be used as the second course target point.

Further, in the first embodiment, the first distance D1 is calculated as the interval between the second straight line L2 and the first boundary line Lb1. Alternatively, the first distance D1 may be calculated as the interval between the stop line 31c and the second straight line L2. In that case, the first offset value Offset1 may be calculated according to the first distance D1 that is the interval between the stop line 31c and the second straight line L2.

Further, when the first course 31 and the second course 32 diagonally intersect each other, the first offset value Offset1 and/or the second offset value Offset2 may be determined according to an intersecting angle between the first course 31 and the second course 32.

On the contrary, in the first embodiment, the traveling track determination device 1 is applied to determine the traveling track Xf at right turn in the intersection 30 of the crossroad. However, the traveling track determination device of the present disclosure is not limited to this, and may be applied to determine the traveling track at traveling of the vehicle from a first course to a second course that is bent and connected to the first course. For example, the traveling track determination device of the present disclosure may determine a traveling track at right turn in diagonally intersecting crossroad, T-junction, trifurcate road, or multi-forked road.

In the first embodiment, the automated drive device 1 and the traveling track determination device 1 of the present disclosure are applied to the four-wheeled vehicle. However, the automated drive device and the traveling track determination device of the present disclosure may be also applied to two-wheeled, three-wheeled, and five or more-wheeled vehicles.

Further, in the first embodiment, the median strip 32a is the lane boundary area. However, the lane boundary area of the present disclosure is not limited to this, and may be any boundary area between a lane in the traveling direction of the vehicle and an opposite lane on the second course. For example, an area equipped with a guardrail, a fence, or the like may be the lane boundary area.

Next, an automated drive device according to a second embodiment is described. The automated drive device in the second embodiment is partially different from the automated drive device 1 in the first embodiment only in the changed track calculation processing during right turn and the changed track control processing during right turn. The difference is described below.

Figure 10:
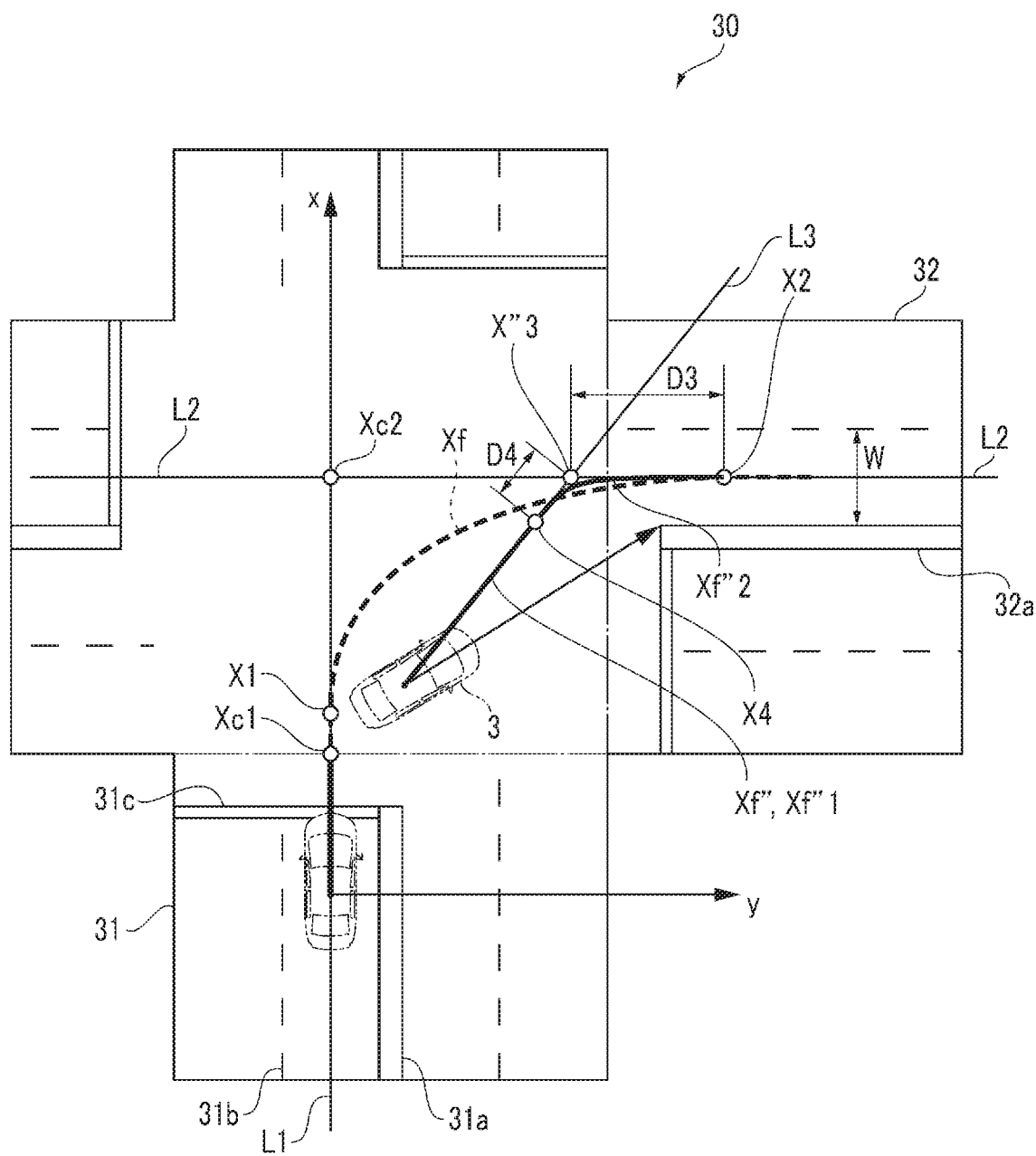
FIG. 10 is a view illustrating a principle of a method of calculating a changed track during right turn according to a second embodiment.

First, with reference to FIG. 10, the principle of the changed track calculation processing during right turn in the second embodiment is described. For example, in the case where the vehicle 3 turns to the right in the intersection 30, it is assumed that the traveling track Xf for right turn represented as the broken line in FIG. 10 is calculated and then, the automated drive control processing for right/left turn is executed.

When, for some reason, as illustrated in FIG. 10, it is recognized that the vehicle 3 travels off the traveling track Xf and the obstacle such as the median strip 32a is present in the forward direction of the vehicle 3, to avoid the obstacle, the changed track during right turn is selectively calculated using two calculation methods according to a vehicle speed VP and a lane width W. The vehicle speed VP is traveling speed of the vehicle 3, and the lane width W is a width of the lane on the second course 32 toward which the vehicle 3 travels.

Specifically, if none of the following two conditions (C1) and (C2) is satisfied, the changed track Xf' is calculated by the calculation method in the first embodiment.

(C1) The vehicle speed VP is a predetermined vehicle speed VP1 (for example, 30 km/h) or more.

(C2) The lane width W is a predetermined width W1 (for example, 3 m) or less.

On the contrary, if at least one of the above two conditions (C1) and (C2) is satisfied, a changed track Xf" is calculated by a below-mentioned method.

First, an interference avoidance point X3" (third predetermined point) is calculated based on the second predetermined point X2 at calculation of the traveling track Xf. The interference avoidance point X3" is calculated as a point displaced from the second predetermined point X2 on the second straight line L2 toward the intersection 30 by a predetermined distance D3. The predetermined distance D3 is calculated by searching a map not illustrated according to the distance between the vehicle 3 and the obstacle.

Subsequently, a third straight line L3 is defined as a straight line extending from the vehicle 3 through the interference avoidance point X3", and a point separated from the interference avoidance point X3" on the third straight line L3 toward the vehicle 3 by a predetermined distance D4 is calculated as a fourth predetermined point X4. The predetermined distance D4 is calculated by searching a map not illustrated according to the lane width W. The fourth predetermined point X4 may be calculated as an intersection between the third straight line L3 and an end line of the lane on the second course 32 on the side of the median strip 32a.

Then, changed track Xf" is calculated as a track connecting a straight track Xf"1 between the vehicle 3 and the fourth predetermined point X4 to a curved track Xf"2 between the fourth predetermined point X4 and the second predetermined point X2. The curved track Xf"2 (second curved line) is calculated as a quadratic Bézier curve using the fourth predetermined point X4, the interference avoidance point X3", and the second predetermined point X2 as the control points by the same equations as the above-mentioned equations (1) and (2).

Figure 11:
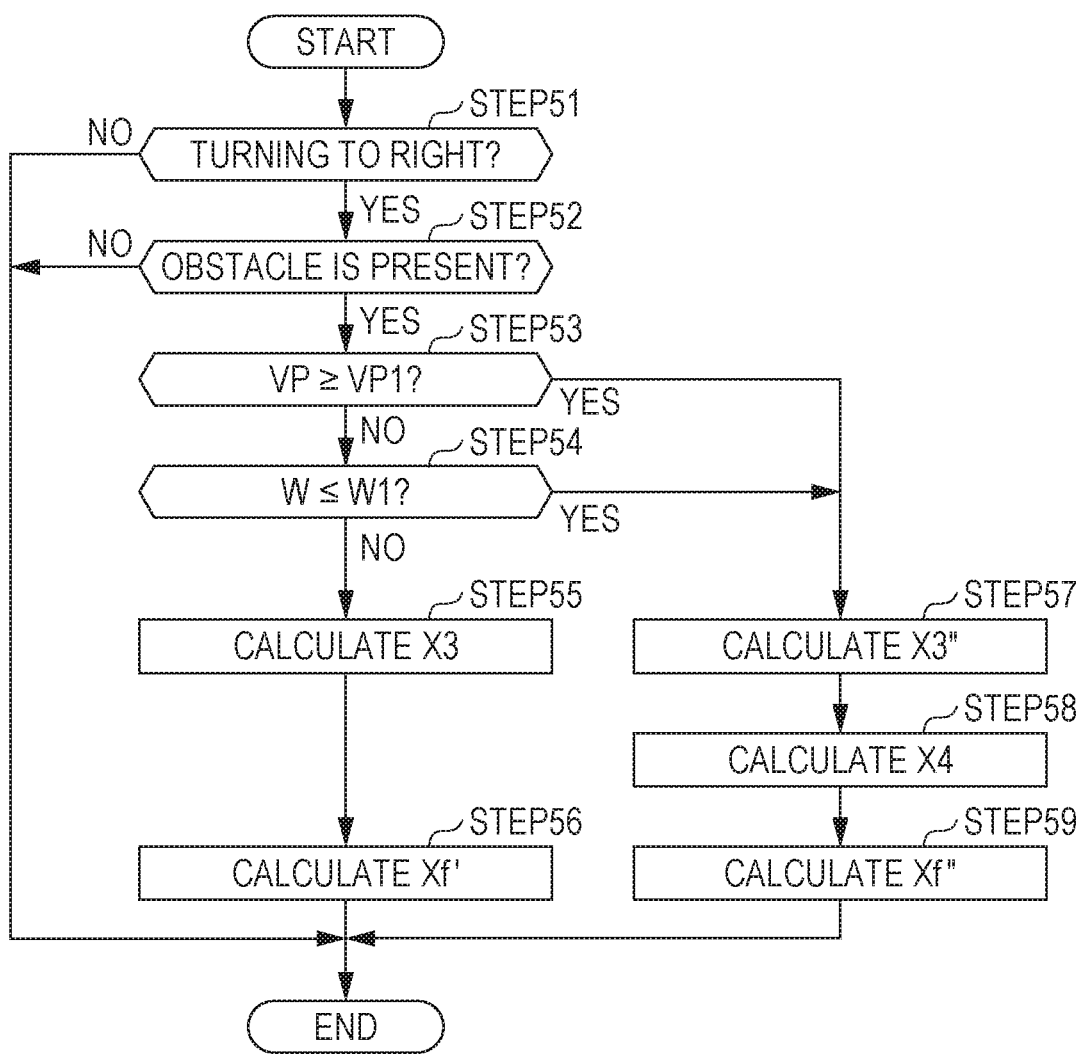
FIG. 11 is a flow chart illustrating changed track calculation processing during right turn in the second embodiment.

Next, with reference to FIG. 11, the changed track calculation processing during right turn in the second embodiment is specifically described. The ECU 2 executes the processing to selectively calculate the changed track Xf' or the changed track Xf" as described above at the same control cycle as the calculation cycle of the traveling track Xf.

As illustrated in the figure, first, it is determined whether or not the vehicle 3 is turning to the right (FIG. 11/STEP 51). If the determination is NO (FIG. 11/STEP 51: NO), the present processing is terminated as it is.

On the contrary, if the determination is YES (FIG. 11/STEP 51: YES) and the vehicle 3 is turning to the right, it is determined whether or not the obstacle such as the median strip is present in front of the vehicle 3 based on the surrounding status data D_info (FIG. 11/STEP 52).

If the determination is NO (FIG. 11/STEP 52: NO), the present processing is terminated as it is. On the contrary, if the determination is YES (FIG. 11/STEP 52: YES) and the obstacle such as the median strip is present in front of the vehicle 3, it is determined whether or not the vehicle speed VP is the predetermined vehicle speed VP1 or less (FIG. 11/STEP 53).

If the determination is NO (FIG. 11/STEP 53: NO), that is, VP<VP1 is satisfied, it is determined whether or not the lane width W is the predetermined width W1 or less (FIG. 11/STEP 54).

If the determination is NO (FIG. 11/STEP 54: NO), that is, VP<VP1 and W>W1 are satisfied, the third predetermined point X3 is calculated by the above-mentioned method (FIG. 11/STEP 55).

Subsequently, as described above, the changed track Xf' is calculated as the track connecting the straight track between the vehicle 3 and the third predetermined point X3 to the straight track between the third predetermined point X3 and the second predetermined point X2 (FIG. 11/STEP 56). After that, the present processing is terminated.

On the contrary, in the above-mentioned determination, if VP≥VP1 is satisfied (FIG. 11/STEP 53: YES) or W≤W1 is satisfied (FIG. 11/STEP 54: YES), the interference avoidance point X3" is calculated by the above-mentioned calculation method (FIG. 11/STEP 57).

Subsequently, the fourth predetermined point X4 is calculated by the above-mentioned calculation method (FIG. 11/STEP 58). Next, the above-mentioned calculation method, the changed track Xf" is calculated as the track connecting the straight track Xf"1 between the vehicle 3 and the fourth predetermined point X4 to the curved track Xf"2 between the fourth predetermined point X4 to the second predetermined point X2 (FIG. 11/STEP 59). As described above, after the changed track Xf" is calculated, the present processing is terminated.

Next, with reference to FIG. 12, the changed track control processing during right turn is described. The ECU 2 executes the processing to control the motor 5 and the actuator 6 such that the vehicle 3 travels on one of the two changed tracks Xf' and Xf" calculated as describe above, at the same control cycle as the cycle of the automated drive control processing for right/left turn.

As illustrated in the figure, first, it is determined whether or not the vehicle 3 is turning to the right (FIG. 12/STEP 71). If the determination is NO (FIG. 12/STEP 71: NO), the present processing is terminated as it is.

On the contrary, if the determination is YES (FIG. 8/STEP 71: YES) and the vehicle 3 is turning to the right, it is determined whether or not changed track Xf' has been calculated (FIG. 8/STEP 72).

If the determination is NO and the changed track Xf' is not calculated (FIG. 12/STEP 72: NO), it is determined whether or not the changed track Xf" has been calculated (FIG. 12/STEP 75). If the determination is NO (FIG. 12/STEP: 75: NO), that is, none of the two changed tracks Xf' and Xf" has been calculated, the present processing is terminated as it is.

On the contrary, in the above-mentioned determination, if the changed track Xf' has been calculated (FIG. 12/STEP 72: YES) or the changed track Xf" has been calculated (FIG. 12/STEP 75: YES), the motor 5 is controlled such that the vehicle 3 travels on the calculated one of the two changed tracks Xf' and Xf" (FIG. 12/STEP 73).

Subsequently, the actuator 6 is controlled such that the vehicle 3 travels on the calculated one of the two changed tracks Xf', Xf" (FIG. 12/STEP 74). After that, the present processing is terminated.

As described above, in the automated drive device 1 in the second embodiment, when the vehicle 3 turns to the right in the intersection 30, if it is recognized that the vehicle 3 travels off the traveling track Xf and the obstacle such as the median strip 32a is present in the forward direction of the vehicle 3, to avoid the obstacle, the changed tracks Xf' and Xf" are calculated. At this time, if VP≥VP1 is satisfied or W≤W1 is satisfied, the changed track Xf" is calculated as the track connecting the straight track Xf"1 between the vehicle 3 and the fourth predetermined point X4 to the curved track Xf"2 between the fourth predetermined point X4 and the second predetermined point X2. On the contrary, if VP<VP1 and W>W1 are satisfied, the changed track Xf' is calculated as the track connecting the straight track between the vehicle 3 and the third predetermined point X3 to the straight track between the third predetermined point X3 and the second predetermined point X2 by the same method as the method in the first embodiment.

In this case, if VP≥VP1 is satisfied, that is, the vehicle speed is high, when it is controlled such that the vehicle 3 travels on the changed track Xf' shaped like a bent line, the vehicle 3 is likely to travel off the changed track Xf'. If W≤W1 is satisfied, that is, the lane width of the second course 32 is small, when it is controlled such that the vehicle 3 travels on the changed track Xf' shaped like a bent line, the vehicle 3 may be hard to smoothly enter into the second course 32.

On the contrary, if VP≥VP1 is satisfied or W W1 is satisfied, the changed track Xf" is calculated as the track connecting the straight track Xf"1 to the curved track Xf"2. Therefore, as compared to the case of using the changed track Xf' shaped like a bent line, even when the vehicle speed is high, the vehicle 3 may be prevented from traveling off the traveling track Xf, and even when the lane width is small, the vehicle 3 may smoothly enter into the second course 32.

In the second embodiment, the curved track Xf"2 that is the Bézier curve is used as the second curved line. However, the second curved line of the present disclosure is not limited to this, and may be any line that extends between the fourth predetermined point closer to the vehicle than the third predetermined point on the third straight line and the second predetermined point on the second straight line, and protrudes toward the third predetermined point. For example, a B spline curve may be used as the second curved line. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A traveling track determination device that determines a future traveling track for a vehicle when the vehicle travels from a first course toward a second course which is bent relative to and connected to the first course, the traveling track determination device comprising:
  a second course target point acquisition processor that acquires a second course target point that is a target of future traveling on the second course;
  a traveling track determination processor that determines the future traveling track for the vehicle using:
  (i) a first straight line that extends from the vehicle in a forward direction of the vehicle through a continuous section between the first course and the second course,
  (ii) a second straight line that extends along the second course while passing through the second course target point and intersects with the first straight line in the continuous section and,
  (iii) a first curved line that extends between a first predetermined point on the first straight line and a second predetermined point on the second straight line and protrudes toward an intersection of the first straight line and the second straight line, wherein the traveling track determination processor determines the future traveling track such that at least a portion of the first curved line is included in the continuous section;
  a lane boundary area acquisition processor that acquires a lane boundary area corresponding to a boundary area between a lane on which the vehicle travels in the second course and an opposite lane in the second course;
  a traveling environment acquisition processor that acquires traveling environment of the traveling vehicle when the vehicle actually travels on the traveling track according to the future traveling track after determination of the future traveling track; and
  a traveling track change processor that, when the vehicle travels toward the second course while the vehicle crosses an opposite lane of the first course in the continuous section, changes the future traveling track so as to avoid interference of the vehicle with the lane boundary area, if it is determined that the lane boundary area is present in a course of the vehicle based on the traveling environment acquired by the traveling environment acquisition processor,
  wherein the traveling track determination device determines the future traveling track for the vehicle without using lane network data, and
  the traveling track determination device determines the future traveling track for the vehicle in an area having no lane mark,
  wherein the traveling track determination device further comprises a second boundary line acquisition processor that acquires a second boundary line defining a boundary between the second course and the continuous section, wherein
  the traveling track determination processor determines the future traveling track such that the second predetermined point on the second straight line is displaced from a third intersection that is an intersection of the second straight line and the second boundary line toward a direction which is opposite to the continuous section, wherein the second predetermined point is an end point of the first curved line and a junction of the first curved line and the second straight line, wherein the traveling track determination device further comprises:

a vehicle speed acquisition processor that acquires a vehicle speed that is a speed of the vehicle; and a lane width acquisition processor that acquires a lane width that is a width of a traveling lane for the vehicle on the second course, wherein when the future traveling track is changed, in a case that the vehicle speed is a predetermined vehicle speed or more, or the lane width is a predetermined width or less, the traveling track change processor determines a point on the second straight line which is located closer to the intersection of the second straight line and the first straight line relative to the second predetermined point as a third predetermined point, and determines the changed future traveling track using:

(iv) a third straight line that extends from the vehicle through the third predetermined point, and (v) a second curved line that extends between (1) a fourth predetermined point closer to the vehicle relative to the third predetermined point on the third straight line and (2) the second predetermined point on the second straight line and that protrudes toward the third predetermined point.

2. The traveling track determination device according to claim 1, further comprising a first boundary line acquisition processor that acquires a first boundary line defining a boundary between the first course and the continuous section, wherein the traveling track determination processor determines the future traveling track such that the first predetermined point on the first straight line is displaced in the forward direction of the vehicle from a first intersection that is an intersection of the first straight line and the first boundary line, wherein the first predetermined point is a starting point of the first curved line and a bifurcation point of the first curved line and the first straight line.

3. The traveling track determination device according to claim 2, wherein the intersection of the second straight line and the first straight line is a second intersection, and the traveling track determination processor determines a displacement of the first predetermined point from the first intersection according to a distance between the second intersection and the first intersection.

4. The traveling track determination device according to claim 1, wherein the intersection of the second straight line and the first straight line is a second intersection, and the traveling track determination processor determines a displacement of the second predetermined point from the third intersection according to a distance between the third intersection and the second intersection.

5. The traveling track determination device according to claim 1, wherein the traveling environment acquisition processor acquires whether there exists a structure having a height in the lane boundary area, and the traveling track change processor changes the future traveling track so as to avoid interference of the vehicle with the structure when the structure having the height is present in the lane boundary area in the forward direction of the vehicle.

6. An automated drive device comprising:

the traveling track determination device according to claim 1; and a controller that controls a traveling state of the vehicle using the future traveling track.

7. The traveling track determination device according to claim 1, wherein the traveling track determination processor determines the future traveling track without using map or map data with respect to the first course, the second course and the continuous section.

8. The traveling track determination device according to claim 7, wherein the second course target point acquisition processor acquires the second course target point without using the map or the map data with respect to the second course.

9. The traveling track determination device according to claim 1, wherein the continuous section is an intersection of the first course and the second course.

10. A method executed by an on-board computer, the method determining a future traveling track for a vehicle when the vehicle travels from a first course toward a second course which is bent relative to and connected to the first course, the method comprising steps of:

acquiring a second course target point that is a target of future traveling on the second course; and determining the future traveling track for the vehicle using:

(i) a first straight line that extends from the vehicle in a forward direction of the vehicle through a continuous section between the first course and the second course, (ii) a second straight line that extends along the second course while passing through the second course target point and intersects with the first straight line in the continuous section, and (iii) a first curved line that extends between a first predetermined point on the first straight line and a second predetermined point on the second straight line and protrudes toward an intersection of the first straight line and the second straight line, wherein the determining step determines the future traveling track such that at least a portion of the first curved line is included in the continuous section;

acquiring a lane boundary area corresponding to a boundary area between a lane on which the vehicle travels in the second course and an opposite lane in the second course;

acquiring traveling environment of the traveling vehicle when the vehicle actually travels on the traveling track according to the future traveling track after determination of the future traveling track; and when the vehicle travels toward the second course while the vehicle crosses an opposite lane of the first course in the continuous section, changing the future traveling track so as to avoid interference of the vehicle with the lane boundary area, if it is determined that the lane boundary area is present in a course of the vehicle based on the acquired traveling environment, wherein the determining the future traveling track step determines the future traveling track for the vehicle without using lane network data, and the determining the future traveling track step determines the future traveling track for the vehicle in an area having no lane mark, wherein the method further comprises acquiring a second boundary line defining a boundary between the second course and the continuous section, wherein the determining the future traveling track step determines the future traveling track such that the second predetermined point on the second straight line is displaced from a third intersection that is an intersection of the second straight line and the second boundary line toward a direction which is opposite to the continuous section, wherein the second predetermined point is an end point of the first curved line and a junction of the first curved line and the second straight line, wherein the method further comprises:

acquiring a vehicle speed that is a speed of the vehicle; and acquiring a lane width that is a width of a traveling lane for the vehicle on the second course, wherein when the future traveling track is changed, in a case that the vehicle speed is a predetermined vehicle speed or more, or the lane width is a predetermined width or less, the changing step determines a point on the second straight line which is located closer to the intersection of the second straight line and the first straight line relative to the second predetermined point as a third predetermined point, and determines the changed future traveling track using:

(iv) a third straight line that extends from the vehicle through the third predetermined point, and (v) a second curved line that extends between (1) a fourth predetermined point closer to the vehicle relative to the third predetermined point on the third straight line and (2) the second predetermined point on the second straight line and that protrudes toward the third predetermined point.

11. A non-transitory computer readable medium storing a program for causing an on-board computer to execute processing to determine a future traveling track for a vehicle when the vehicle travels from a first course toward a second course which is bent relative to and connected to the first course, the processing comprising steps of:

acquiring a second course target point that is a target of future traveling on the second course; and determining the future traveling track for the vehicle using:

(i) a first straight line that extends from the vehicle in a forward direction of the vehicle through a continuous section between the first course and the second course, (ii) a second straight line that extends along the second course while passing through the second course target point and intersects with the first straight line in the continuous section, and (iii) a first curved line that extends between a first predetermined point on the first straight line and a second predetermined point on the second straight line and protrudes toward an intersection of the first straight line and the second straight line, wherein the determining step determines the future traveling track such that at least a portion of the first curved line is included in the continuous section;

acquiring a lane boundary area corresponding to a boundary area between a lane on which the vehicle travels in the second course and an opposite lane in the second course;

acquiring traveling environment of the traveling vehicle when the vehicle actually travels on the traveling track according to the future traveling track after determination of the future traveling track; and when the vehicle travels toward the second course while the vehicle crosses an opposite lane of the first course in the continuous section, changing the future traveling track so as to avoid interference of the vehicle with the lane boundary area, if it is determined that the lane boundary area is present in a course of the vehicle based on the acquired traveling environment, wherein the determining the future traveling track step determines the future traveling track for the vehicle without using lane network data, and the determining the future traveling track step determines the future traveling track for the vehicle in an area having no lane mark, wherein the processing further comprises acquiring a second boundary line defining a boundary between the second course and the continuous section, wherein the determining the future traveling track step determines the future traveling track such that the second predetermined point on the second straight line is displaced from a third intersection that is an intersection of the second straight line and the second boundary line toward a direction which is opposite to the continuous section, wherein the second predetermined point is an end point of the first curved line and a junction of the first curved line and the second straight line, wherein the processing further comprises:

acquiring a vehicle speed that is a speed of the vehicle; and acquiring a lane width that is a width of a traveling lane for the vehicle on the second course, wherein when the future traveling track is changed, in a case that the vehicle speed is a predetermined vehicle speed or more, or the lane width is a predetermined width or less, the changing step determines a point on the second straight line which is located closer to the intersection of the second straight line and the first straight line relative to the second predetermined point as a third predetermined point, and determines the changed future traveling track using:

(iv) a third straight line that extends from the vehicle through the third predetermined point, and (v) a second curved line that extends between (1) a fourth predetermined point closer to the vehicle relative to the third predetermined point on the third straight line and (2) the second predetermined point on the second straight line and that protrudes toward the third predetermined point.

* * * * *